Nov. 26, 1935.    H. H. SHELDON    2,022,327
APPARATUS FOR THE COMPARISON OF COLORS
Filed June 28, 1932    3 Sheets-Sheet 1

INVENTOR
Harold H. Sheldon,
BY
ATTORNEY

Nov. 26, 1935.    H. H. SHELDON    2,022,327
APPARATUS FOR THE COMPARISON OF COLORS
Filed June 28, 1932    3 Sheets-Sheet 2
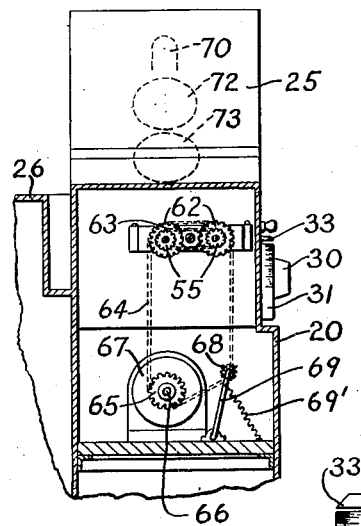
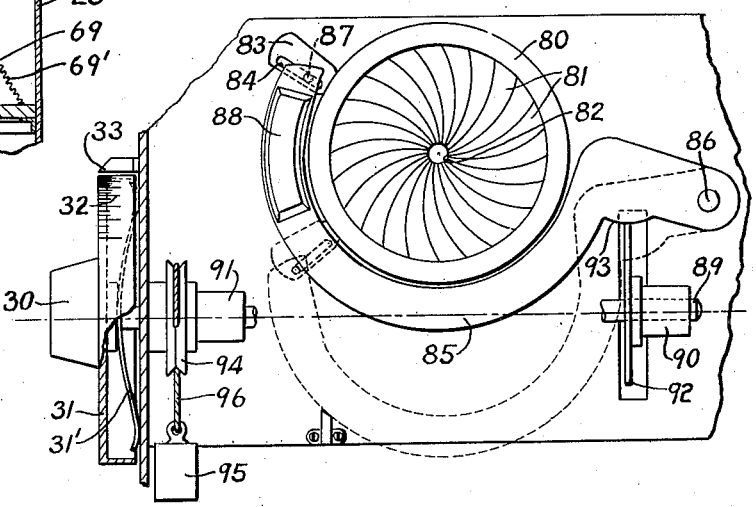
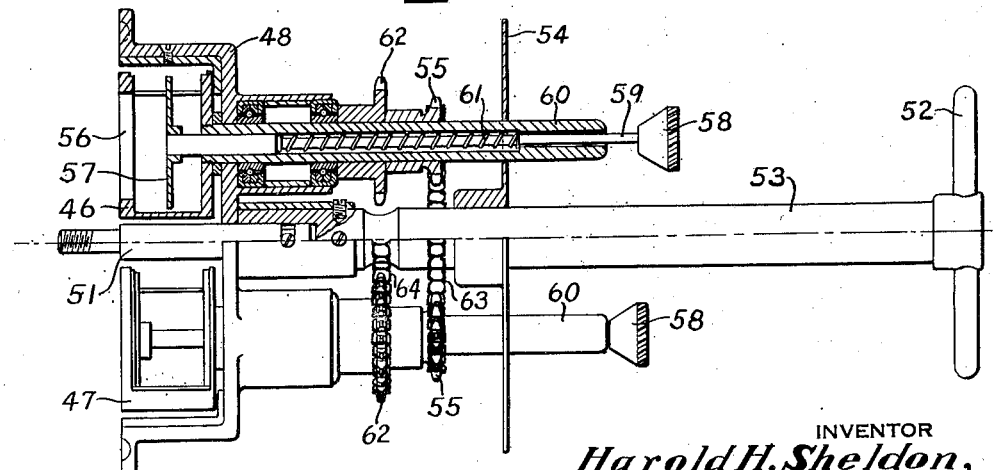
INVENTOR
Harold H. Sheldon,
BY
ATTORNEY Nov. 26, 1935.　　H. H. SHELDON　　2,022,327
APPARATUS FOR THE COMPARISON OF COLORS
Filed June 28, 1932　　3 Sheets-Sheet 3

INVENTOR-
Harold H. Sheldon,
BY
ATTORNEY-

Patented Nov. 26, 1935

2,022,327

UNITED STATES PATENT OFFICE 2,022,327

APPARATUS FOR THE COMPARISON OF COLORS

Harold Horton Sheldon, Yonkers, N. Y., assignor to Sheldon Electric Corporation, New York, N. Y., a corporation of New York Application June 28, 1932, Serial No. 619,728

5 Claims. (Cl. 88—14)

This invention relates to means for comparing the color, shade and similar characteristics of materials, whether in a solid, liquid or gaseous state.

My invention discloses apparatus adapted for the commercial accomplishment of this purpose and adapted for operation by a person comparatively unskilled in the art of color measurement.

One object of this invention is to use photoelectric cells for the sensitive and rapid commercial comparison of various materials.

Another object of this invention is to allow a comparatively unvarying light source and a photo-electric cell of a limited range of sensitivity to be employed with one another for the measurement of materials reflecting or transmitting light over a wide range of intensity.

A further object is to allow the convenient and rapid interchange of various samples to be compared with one another, whether in solid, liquid or gaseous form.

Another object of this invention is to provide an apparatus whereby various materials may be readily compared with similar materials of a standard color or shade.

A further purpose is to allow solid samples to be integrated with respect to their optical properties by a system for moving them continuously while being tested.

A further object is to allow such samples to be optically interchanged with one another while this integrating motion is uninterruptedly maintained.

This invention employs certain of the devices disclosed in co-pending application Ser. No. 548,976 filed July 6th, 1931 which has matured into United States Patent No. 1,971,317 issued August 31, 1934.

The arrangement and operation of this invention will be apparent by reference to the following drawings, where:

Fig. 3 is a front elevation of one portion of the apparatus.

Fig. 4 is a detail of the mechanism for controlling the intensity of the transmitted light.

Fig. 5 is a detail of the device for rapidly interchanging samples in rotation.

Figure 1:
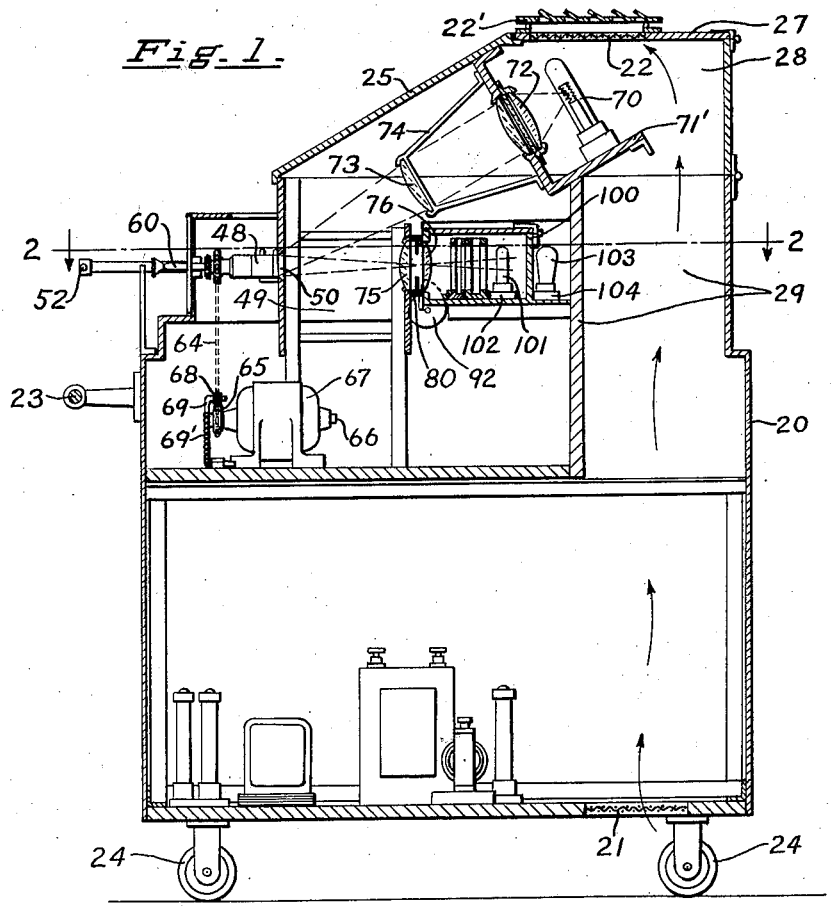
Fig. 1 is a sectional elevation of one side of an apparatus disposed according to this invention.
Figure 2:
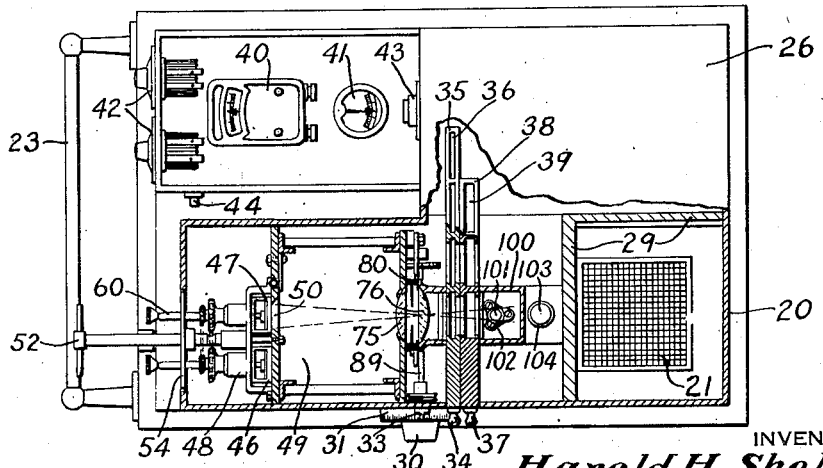
Fig. 2 is a horizontal section of the apparatus partly on the plane indicated at 2—2 of Fig. 1.

Referring now to Figs. 1, 2 and 3, an outside casing 20 preferably of heat resisting material is supplied with suitable screen openings 21, located at the lower portions thereof for the admission of air currents to carry away the heat produced therein during operation.

Other screened openings 22 located at the upper portion of the same serve as outlets for such air current. A bar 23 of suitable mechanical form serves as a protection for the controls and casters 24 may be provided in order to allow the convenient movement of the entire apparatus from spot to spot. A louvered cover 22' may also be provided to prevent the entrance of unwanted light from the exterior.

Hinged or removable covers 25 and 26 allow access to the upper portions of the apparatus. A hinged door 27 allows access to the light generating chamber without the necessity of removing or opening one of the larger covers. All these covers are preferably made of metal or other suitable material, and arranged to close the chambers substantially completely, in an optical sense.

The light source chamber 28 is separated from the other portions of the apparatus by walls indicated at 29 which are preferably of metal covered with heat insulating material such as asbestos, in order to minimize heat transfer to the other portions of the apparatus. The general direction of the cooling air currents through the apparatus is indicated by arrows.

At 30 is indicated the adjusting handle which projects from one side of the outer casing and bears a drum 31 carrying suitable graduations 32 upon its surface. A stationary pointer 33 serves as a reference point for indicating the relative angular position of drum 31. This adjustment serves to vary the light intensity by actuating certain devices within the cabinet, to be described hereinafter.

34 represents a knob extending to one side of the cabinet and allowing the control of the lateral position of a sliding carrier 35. Carrier 35 is provided with suitably grooved openings 36 designed to allow the ready insertion and removal of various filters in a convenient solid form such as pieces of colored glass or the like. At 37 is represented another similar knob which allows control of the position of a second carrier 38 also having openings 39 therein. These openings are suited for the reception of filters in the form of transparent cells of glass, quartz or the like. These cells may serve to hold filtering media in the form of liquids or gases.

Carriers 35 and 38 are arranged to slide in suitable supports so that any one of the various filter glasses or filter cells carried thereby may be placed in the optically active portion of this apparatus.

At 40 is represented an indicating galvanometer which may serve as an ultimate indicator of the optical properties of materials to be measured by this apparatus. At 41 is shown a voltmeter which may serve to indicate the value or strength of any power supply furnishing current to this apparatus.

At 42 are shown two variable resistances, preferably of the potentiometer type and serving to allow adjustment of the resistance of certain electrical measuring circuits of this apparatus. 43 indicates a similar adjustable resistance also serving to control an electrical measuring circuit.

At 44 is shown a switch readily accessible to the operator and serving readily to change the sensitivity or measuring range of the apparatus especially to avoid overloading and/or damaging the indicating galvanometer thereof.

Referring now in addition to Fig. 5 the sample holders of this apparatus or the devices adapted to conveniently contain samples of solid materials to be compared thereby, take the form of two rotating members 46 and 47.

These two members are carried by a normally stationary frame 48, mounted on one outer wall of an optically enclosed chamber 49. This wall has an opening 50 directly opposite one of the sample holding members.

The frame and sample holders are adapted to rotate about a common central member 51 by the manipulation of handle 52 and shaft 53 associated therewith. A suitable shield 54 may be used to enclose or shield from accidental contact therewith by the operator, the exposed moving portions of these sample holders. Each sample holder is composed essentially of a rotating member such as 46 in the form of a hollow drum having a part of its peripheral surface removed in order to allow insertion of the sample therein and having an optical opening 56 in one end thereof. This opening is made of uniform size since it determines the effective optical area of the sample tested. A reciprocating piston 57 is capable of rotary motion in addition to its reciprocating motion and may be retracted by handles 58 and shafts 59 extending through suitable hollow shafts 60. Springs 61 coact with shafts 59 and 60 so as to cause pistons 57 to be normally pressed against the end of drum member 46 which has therein the opening 56.

Rotating members 46 and 47 are arranged with suitable bearings and are driven by sprockets 62.

Referring now in addition to Fig. 3, toothed wheels 62 are seen to be provided with associated sprockets 55 affixed firmly on the shaft 60 so as to rotate simultaneously therewith. These latter gears 55 are coupled by a chain 63 linking them. Another chain 64 passes over both of gears 62 and also over a sprocket 65 upon the shaft 66 of a suitable driving motor 67.

An idler gear 68 upon the end of a suitably hinged member 69 is held by means of a spring 69' so as to maintain chain 64 in a suitably taut condition at all times. Motor 67 may alternatively operate sprocket 65 through speed changing gears, if so desired.

When the entire sample holding structure is rotated as a unit about shaft 51 by the manipulation of handle 52, chain 64 will remain in contact with at least one of the sprocket wheels 62 at all times, by the action of idler wheel 68. Likewise at such times as only one of sprockets 62 is in contact with chain 64, the other sprocket 62 will be maintained in continuous rotation through the intermediary action of sprockets 55, chain 63 and shafts 60.

The samples to be measured, when in a suitable solid form, may be placed between piston 57 and the open end of drum 46, while piston 57 is retracted by means of handle 58. Spring 61 will then serve to cause piston 57 to hold the sample firmly when handle 58 is released and while the sample holder is in rotation.

Other relative sizes and mechanical forms of such holders may be used to suit the type of samples to be inserted therein, such as cylinders in which textiles may be inserted and the like.

When handle 52 is turned, one sample holder will take the place of the other immediately before aperture 50, without interrupting the individual rotary motion of the samples in the two holders. This allows the comparatively rapid interchange of two samples, both of them being rapidly and continuously rotated. This double assembly may manifestly easily be altered to allow three or more individual sample holders to be used.

Describing now the optical system of my invention, 70 indicates a suitable source of light such as a concentrated filament incandescent lamp, mounted in a suitable socket 71. The light from this lamp is concentrated by means of a suitable lens system 72 which may be inserted in a transverse heat insulating partition 71' mounted within the cover 26 and forming a closure with one of the walls 29 for the chamber 28. This lens system may consist of any suitable combination of lenses and/or filters. Such lenses and/or filters may be constructed of heat resisting material, or of material which exerts a filtering action upon heat rays in order to prevent the passage of undesired heat rays through the same.

At 73 is indicated another lens held in a suitable framework 74 fastened to the partition 71'. Lens 73 is arranged to concentrate the light rays upon the surface of the sample which lies immediately behind opening 50.

The light directly reflected from the surface of the sample reaches the walls of chamber 49, and is absorbed by these walls which may be lined with a suitable material for this purpose, such as black paint of a high light absorption factor, or the like.

The secondary light rays proceeding from the surface of the sample and due to its illumination by light source 70 proceed through lenses 75 and 76, which may constitute an optical system suited to concentrate and direct the light. Between these two lenses may be interposed an iris diaphragm 80, for controlling the light passing therethrough.

Referring now also to Fig. 4, the details of this iris diaphragm and its control are as follows: suitably shaped plates 81 coact with one another to change the size of optical aperture 82 when control lever 83 is moved in an arc about the periphery of the diaphragm assembly. The detailed construction of such iris diaphragms is well known in the photographic art and accordingly it is not shown or described in detail.

Actuating member 83 is provided with a slot 84 extending radially therein. An arcuate member 85 swinging upon pivot 86 between the limits indicated by the full lines and the dotted lines of Fig. 4, serves to move member 83 by means of pin 87 which engages slot 84. A suitable weight 88 may be employed upon one end of member 85 to ensure its descent under the influence of gravity when it is not supported. At 89 is indicated a shaft which is affixed to handle 30 and drum 31 so as to rotate therewith. This shaft turns in bearings 90 and 91 and carries a suitable cam member 92. This cam operates to raise and lower the member 85, which latter actuates the diaphragm proper. A suitable bearing surface 93 may be provided upon member 85 against which cam 92 may bear.

At a suitable point along shaft 89 is provided a pulley 94. A counter weight 95 hangs by means of a cable or rope 96 whose other extremity is affixed to pulley 94 in such wise as to tend to rotate the latter in one direction.

The downward pressure of member 85 due to the gravitational pull upon the affixed weight 88, acting upon cam 92 tends to cause shaft 89 to rotate in a certain direction. Cable 96 is so disposed upon pulley 94 as to tend to rotate shaft 89 in the opposite direction by the force due to gravitational action upon the counter weight 95 suspended from cable 96. This system of weights and counter balances and a friction spring 31' are designed to secure the effect that drum 31 and iris diaphragm 81 will remain in the position in which they are placed, until moved by the manipulation of handle 30, which latter action will cause the iris diaphragm to open or close to a degree proportional to the degree of rotation of the handle and to the form of cam 92, which form can be made such, by well-known methods of computation, that the light admitted through the diaphragm will be proportional in a linear or other fashion to the degree of angular rotation of handle 30, or to any desired function thereof.

The light rays after passing through the optical control system comprised by lenses 75 and 76 and the iris diaphragm 80 between them, are now projected through the filter devices 35 and 38 previously described.

These devices allow any desired material, either in solid, liquid or gaseous form, to be placed so that the projected beam of light must pass through it. The employment of two such filters, one adapted to hold solids and the other liquids or gases, allows the operator to employ a large choice of filters and/or to use two filters at the same time. The filtered light rays now enter an opaque light chamber 100. Within this chamber is situated a photo-electric cell 101 placed in a suitable socket 102. This cell may be of any type well known in the photo-electric art, such as of the potassium or cæsium oxide types. The electric current derived from the operation of this cell is transmitted by suitable conductors, preferably short and extremely well insulated, to an amplifying tube 103 located immediately behind and exterior to the tube chamber 100. This tube is also located in a suitable socket 104 and may be of any type suitable for connection to a photo-electric cell for amplifying purposes.

Figure 6:
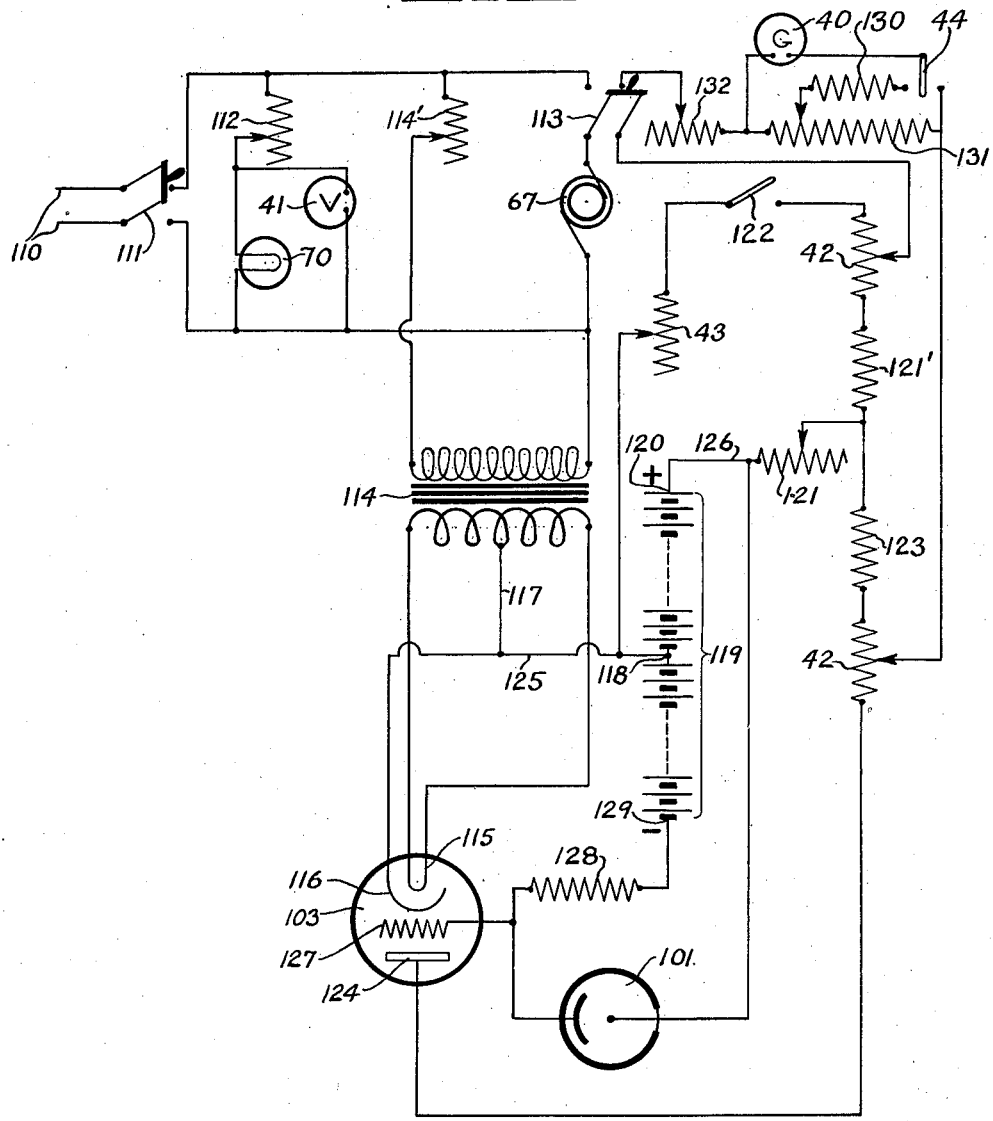
Fig. 6 is a schematic representation of a typical electrical circuit suitable for one form of the invention herein described.

Referring now to Fig. 6, there is here shown a schematic diagram of a form of electrical circuit serving to interconnect the various electrical components of this apparatus, to exercise suitable control of these components and to allow the ultimate readings of galvanometer 40 to be interpreted in terms of the optical properties of the samples under test.

The power supply lines indicated at 110 pass through a suitable control switch 111 and then have bridged across them the light source 70 with a suitable series controlling resistance 112 which may be manually controlled or of a form operating automatically or semi-automatically so as to keep the voltage impressed upon the lamp 70 substantially uniform. A voltmeter 41 is also bridged across the light source so as to indicate to the operator when adjustment of the various voltage controls may be needed. It may sometimes be found desirable to connect this meter across the power lines rather than the light source.

These power lines also serve to actuate motor 67 through the left hand blade and contacts of switch 113, when the latter is in the closed position. A transformer 114 also has its primary bridged across these power lines through a suitable controlling resistance 114' which may be either of the manually controlled or of the automatic type. This transformer has its primary wound to a voltage corresponding to that of the power supply and its secondary wound to produce a voltage and current suitable to operate the cathode heater 115 of amplifying tube 103, or the filament of a directly heated type of tube which may be used in lieu of the indirectly heated type here shown.

Amplifying tube 103 as herein shown is one having a separately heated cathode 116, which is connected to the electrical midpoint of heater 115 by means of a mid-tap connection 117 extending therefrom to the electrical center of the secondary winding of transformer 114.

It is understood that a directly heated cathode may be employed, in which case no external connections of cathode and heater will be needed since they will then be physically identical. This point of connection is taken as the point of minimum potential of the circuit and is connected to a suitable intermediate point 118 of a high voltage supply battery 119, chosen as hereinafter described.

The operation of the circuit now to be described is that having reference especially to the currents derived from the action of photo-electric cell 101. When switch 113 is closed the right hand blade and contacts thereof close the circuit to indicating galvanometer 40. This control connection is so arranged in order that galvanometer 40 may be connected to the circuit only when motor 67 is also connected, and also in order to avoid any overload or excessive currents through the galvanometer. The output from the high potential terminal 120 of battery 119 passes through conductor 126 to a suitable regulating resistance 121 and then branches through two arms of a bridge structure. In one arm of this structure is found fixed resistance 121', variable resistance 42 and battery control switch 122, which latter serves to prevent current from battery 119 flowing through this arm of the bridge when such current is not needed for measuring purposes.

If battery 119 be replaced by a substitute source of potential, actuated from power supply lines 110 through switch 111, switch 122 may be omitted, as switch 111 will then also control such substitute potential supply.

This arm of the bridge also contains variable resistance 43 which serves to control the total value of resistance in this arm. The other arm of the bridge contains another fixed resistance 123 similar in value to resistance 121, and another variable resistance 42 which may be identical with that in the first described arm. In this arm of the bridge is also located the internal or space impedance of tube 103, existing between its anode 124 and its cathode 116. The return from the cathode 116 is made through conductor 125 extending from the point of minimum potential of the circuit back to a suitable point upon power battery 119 as hereinbefore described.

Photo-electric cell 101 is bridged between conductor 126, which connects resistance 121 to high potential point 120, and the control grid 127 of amplifying tube 103. Between this control grid 127 and cathode 116 is interposed a suitable conductive biasing circuit comprising coupling resistance 128 and the portion 129 of battery 119 which thus serves to bias this control grid to a suitable negative potential.

It is to be understood that all the electrical components of this circuit have been illustrated by conventional devices such as batteries and transformers which by appropriate artifices may be substituted for one another according to principles well known in the electrical art.

It is also to be understood that other power supplies such as so-called B eliminators or continuous current generators may be substituted for battery 119 or any of the divisional parts thereof. While not confined to any particular values of potentials or resistance, which may of necessity vary with the electrical constants of the photoelectric cells, batteries, transformers, amplifying tubes and the like employed, it has been found that the following values are suitable with commercial apparatus now available. Amplifying tube 103 may have a heater circuit employing a potential of 2.5 which latter will accordingly be the secondary potential of transformer 114. The primary voltage of this transformer and that of power mains 110 may be 110 volts A. C. In case that the power supply is D. C. other suitable electrical apparatus for voltage reduction should be substituted for transformer 114 as well known in the art. Light source 70 and its resistance 112 should be so proportioned that the total voltage drop across the two will be approximately that of power supply through mains 110. Motor 67 as here indicated has an A. C. motor, but if the power supply through mains 110 is D. C. this motor must be of a corresponding type.

The galvanometer may have a suitable protective series resistance 130 of 750 ohms and a suitable potentiometer type shunt resistance 131 of 1000 ohms, switch 44 serving to utilize one or both of these resistances as occasion demands.

Battery 119 may have its high potential lead 120 furnishing a positive potential from 135 volts upwards and its low potential lead 129 furnishing a negative potential of 9 volts to the control grid of tube 103. The grid resistor 128 may be of the order of 10 megohms. Resistances 121' and 123 may be 50,000 ohms each and resistances 42, 18,000 ohms each. The sensitivity resistors 121 and 132 may be variable from 200,000 ohms downwards.

Resistor 43 should be preferably of a value commensurate with the output impedance of tube 103, which for the type shown may be of an order of magnitude between 5000 and 15,000 ohms, but may be greatly below or in excess of these values for other types of amplifying tubes.

The adjustment of the electrical circuit above described will be evident to one skilled in the art, as it comprises the adjustment of a bridge circuit having photoelectric cell 101 in one arm thereof, and the adjustment of the variable resistors until a null indication is secured at galvanometer 40.

When light impinges upon cell 101, the bridge will be thrown out of balance by the changing of the anode resistance of tube 103 due to variations in the potential impressed upon its control grid 127 through the current received from photo-electric cell 101. Galvanometer 40 will accordingly show a deflection which may serve as a measure of the light falling upon cell 101.

For great ranges of light values it may be preferable to alter the resistances controlling galvanometer 40 and use such alterations which may be necessary to restore galvanometer 40 to the null point as indications of the degree of illumination reaching cell 101.

In addition to the electrical controls just described it is also possible with this apparatus to employ the indicating marks upon the periphery of the drum 31 which coincide with the fixed contacting pin 33, as a measure of the light intensity reaching diaphragm 80. In this case the degree of closure of this diaphragm which is necessary in order to give identical or proportional readings upon galvanometer 40 when different samples are compared can serve as a measure of the relative light intensities when different strengths of light impinge upon this diaphragm.

While I am not limited to any particular method of working the apparatus of my invention, one method which may be employed is to place the samples to be compared with one another in the sample holders and to expose them alternately to the light rays from lamp 70 by appropriate manipulation of handle 52, noting the respective readings, of resistances 42 or of diaphragm indicating drum 31 as above described, or noting the deflections of galvanometer 40.

In the case of certain materials such as plush or the like, it may be found advisable to arrange the sample holders of my invention so that they will "wobble" about their axes. This insures the light penetrating in all directions as far as possible "into" the surface of such types of fabrics and avoids inaccurate readings when such materials are being tested. For a similar purpose the sample holder itself may be simultaneously vibrated or rotated about an axis which is not concentric with its own primary axis of rotation.

Alternative methods of integrating the light reflected from samples may be used. For example the photoelectric cell alone or together with its associated optical system may be rotated so as to receive light reflected at different angles from the sample surfaces. Likewise the light source may be rotated in similar fashion, or rotating mirrors may be used to reflect the light impinging upon the samples or reflected therefrom, so as to produce or utilize various angles of reflection.

The use of color filters of this invention is well known and is accordingly not described in detail. Such filters allow the light to be analyzed and tested for various components thereof. In case that the actual samples being tested are liquid or gaseous in nature, they may be placed in one or more of the cells which ordinarily are utilized to hold liquid or gaseous colored filters. In this last case standard reflecting blocks of a suitable material such as magnesium carbonate or the like may be placed in one of the rotating sample holders, which then will serve as a secondary source of illumination.

While there have been indicated certain mechanical arrangements of the parts of this invention, it is not confined to such exact arrangements, but other corresponding or equivalent arrangements which give similar results may be employed in lieu of those shown. Accordingly this invention is limited only by the scope of the hereunto appended claims.

I claim:

1. In electro-optical comparison instruments acting upon a plurality of samples to be compared, means for rotating said samples substantially simultaneously, means for exposing to a source of light one of said samples, means for positioning at will either of said samples so as to expose it to said light source while maintaining the rotation of said samples and means for measuring the optical reaction of each sample.

2. Photo-electric comparison apparatus including a single source of light, a plurality of rotating sample holders receiving samples to be optically compared, means for alternately illuminating each of said holders by said light beam, means for reflecting said light beam in a substantially horizontal direction, light controlling and light translating means in the path of said reflected beam, suitable indicating means connected to said light translating means, and means for rapidly substituting the sample holders for one another in the path of the light beam while uninterruptedly maintaining said holders in rotation.

3. An optical comparator including means for producing light, means for directing it upon a single sample, supporting means for a plurality of samples including a rotatably mounted carrier, a plurality of spring-pressed clamping members, a tubular support rotatably mounted on said carrier for each clamping member, said clamping members and said supports forming part of said carrier and rotating therewith, means for simultaneously rotating both of said tubular supports, means for rotating said carrier so that only one sample at a time is exposed to said light, and electro-optical means measuring the optical reaction of the sample upon which the light is directed.

4. Color comparing apparatus including means for illuminating a single sample, sample changing means including a plurality of sample holders, a plurality of shafts, each carrying a sample holder and rotatable therewith, a plurality of sprockets each affixed to one of said shafts, a driving motor having a shaft, a sprocket affixed to said motor shaft and rotated thereby, a driving mechanical link threaded over all of said sprockets, an idler sprocket also threaded by said link, means for maintaining said idler sprocket under tension, means for rapidly interchangeably positioning either of said sample holders in the light from said illuminating means and for rapidly interchangeably positioning their respective shafts and sprockets while maintaining said mechanical link operatively threaded over all of said sprockets and electro-optical means measuring said illuminated sample.

5. Optical testing apparatus including means for illuminating at any one instant a single sample, means for rapidly interchangeably positioning a plurality of rotating sample holders in the light from said illuminating means, said positioning means including a central shaft rotatable in suitable bearings, a plurality of auxiliary shafts substantially symmetrically grouped about said central shaft and rotatable in bearings affixed to said central shaft, a plurality of sample holders mounted respectively on said auxiliary shafts, sprockets affixed to said auxiliary shafts and actuated by a chain drive passing thereover, other auxiliary sprockets affixed to each of said auxiliary shafts and connected together by an auxiliary chain drive passing thereover, and electro-optical means measuring said illuminated sample.

HAROLD HORTON SHELDON.